United States Patent [19]

Semeghini et al.

[11] Patent Number: 4,487,647
[45] Date of Patent: Dec. 11, 1984

[54] PROCESS AND DEVICE FOR THE CONTINUOUS PRODUCTION OF GLASS FIBER REINFORCED SHEETS OF THERMOPLASTIC POLYMERS

[75] Inventors: Gian L. Semeghini, Ferrara; Roberto Ferrari, Vado Ligure; Vittorino Rizzotto, Albisola Superiore; Alberto Omacini, Milan; Carlo Rossi, Olgiate Olona, all of Italy

[73] Assignees: Vitrofil S.p.A.; Montepolimeri S.p.A., both of Milan, Italy

[21] Appl. No.: 461,517

[22] Filed: Jan. 27, 1983

[30] Foreign Application Priority Data

Jan. 28, 1982 [IT] Italy ............... 19341 A/82

[51] Int. Cl.³ .......................................... B32B 31/00
[52] U.S. Cl. ................................. 156/181; 156/283; 156/309.6; 156/309.9; 156/311; 156/322; 156/324
[58] Field of Search .................. 156/62.2, 62.4, 62.6, 156/166, 167, 180, 181, 177, 178, 176, 273.3, 273.5, 305, 324, 441, 283, 311, 439, 309.9, 440, 309.6; 428/288, 290, 285, 280; 19/299, 305; 264/136, 137; 65/4.4, 3.44; 427/701

[56] References Cited

U.S. PATENT DOCUMENTS

| | | | |
|---|---|---|---|
| 1,899,056 | 2/1933 | Powell | 65/4.4 |
| 2,639,759 | 5/1953 | Simison | 65/4.4 |
| 2,729,028 | 1/1956 | Slayter et al. | 49/17 |
| 2,961,361 | 11/1960 | Dennis | 154/101 |
| 3,337,669 | 8/1967 | Shannon et al. | 264/121 |
| 3,669,638 | 6/1972 | Wong et al. | 65/3 |
| 4,146,417 | 3/1979 | Drelich et al. | 156/62.2 |

FOREIGN PATENT DOCUMENTS 2040801A 12/1978 United Kingdom .

*Primary Examiner*—Michael Ball

[57] ABSTRACT

(1) A process for preparing thermoplastic polymer sheets reinforced with glass fibers, which comprises the successive steps of:
(a) preparing a mat by fall of glass fibers onto a conveyor belt which moves at a speed lower than the fiber feeding speed;
(b) preheating the mat to a temperature lower than the polymer melting temperature;
(c) deposition on the mat, by fall, of a portion of the required polymer in powder;
(d) compression of the mat;
(e) deposition on the mat of another portion of the polymer in powder;
(f) heating the mat to at least the softening temperature of the polymer;
(g) deposition on the mat of the remaining polymer in powder;
(h) compression of the mat and of the polymer at a temperature higher by at least 50° C. than the polymer melting temperature with formation of a sheet.

(2) A device suitable for preparation (1) comprising, in the order:
(A) one or more glass fiber feeders,
(B) a conveyor belt underlying such feeders,
(C) a heating element for the heating of the glass fibers,
(D) a proportioning device about such belt for feeding the powdered polymer,
(E) a fiber compression roller on such belt,
(F) a proportioning device above such belt, for feeding the powdered polymer,
(G) a heating element for the glass fibers,
(H) a proportioning device above such belt for feeding the powdered polymer,
(I) a compression element for compressing the aggregate of the fibers and polymer at a temperature higher by at least 50° C. than the polymer melting temperature.

3 Claims, 1 Drawing Figure

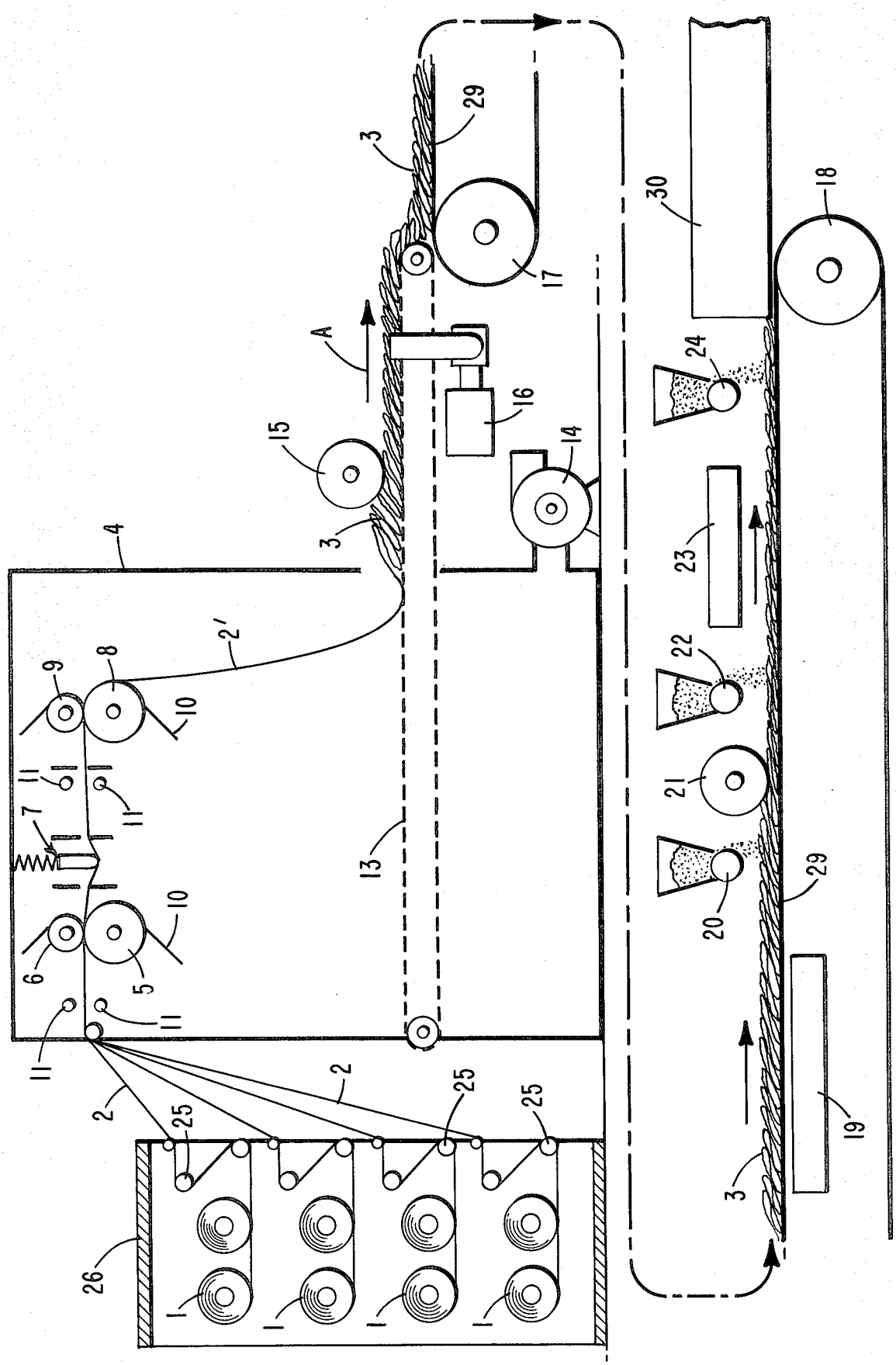

PROCESS AND DEVICE FOR THE CONTINUOUS PRODUCTION OF GLASS FIBER REINFORCED SHEETS OF THERMOPLASTIC POLYMERS

THE PRIOR ART

The production of glass fibers-reinforced sheets, either cut or continuous, suited to be successively thermomolded by heating and compression into finished articles of different shape has been already described in literature.

Typical methods and processes for preparing such sheets are described for example, in U.S. Pat. Nos. 3,664,909, 3,713,962, 3,850,723 and in German Pat. No. 2,312,816.

The glass fibers which are utilized in the above-cited patents are generally pretreated with sizing agents and are always in the form of a continuous or discontinuous, and sometimes needled mat.

According to the methods therein described, a thermoplastic polymer is introduced between two mat layers in the form of a melt, whereupon the aggregate is compressed in continuous and discontinuous flat presses.

Feeding is then stopped, the material is compressed between the plates of a flat press, which have been suitably cooled to permit the thermoplastic polymer to solidfy in order to form a finished sheet. The pressure exerted on the flat press plates is such as to assure a penetration of the molten polymer into the mat.

According to a continuous production method described in German Pat. No. P 2,948,235.7, two layers of glass fiber mat, obtained by needle-bonding the fibers, are conveyed into a continuous press by means of conveyor belts. A thermoplastic polymeric material is extruded inside, i.e. between, the two mat layers, while the upper and lower faces of the mat are preferably coated with a film of said extruded polymer. The film, molten polymer and mat aggregate is conveyed to a continuous press, in the first portion of which the material is subjected to a pressure of 0,1–20 bars, wherefore air is removed, and the polymer is best distributed among the glass fibers.

Successively the material is conveyed to the second portion of the press, operating at the same pressure as the first one, but at a lower temperature, such as to solodify the polymer into sheets.

A process of such type involves therefore the utilization of needle-bonded mats, with consequent sensible increase of the total costs and creation of problems of environmental hygiene due to the splitting of a part of the glass fibers owing to needling.

THE PRESENT INVENTION

One of the objects of the present invention consists therefore in a process for continuously preparing sheets from thermoplastic polymers reinforced with glass fibers, which is free from the above mentioned drawbacks and offers considerable advantages of economic and ecological, as well as technical nature, as it permits to obtain—at the same production speed as in the above-said process—sheets having a better distribution of the glass fibers and a higher homogeneity due to the extreme reduction of entrapped air content, as is proved by their high density which reaches values equal to 98% of the theoretical value. A further object of this invention consists in a device for carrying out said process.

The process according to the present invention comprises, in the order, the steps of:
 (a) preparing a mat of continuous glass strands, such preparating being accomplished by deposition from above, onto the surface of a moving conveyor belt, of glass strands having a count ranging from 10 to 220 tex, the linear feed speed of the strands being higher than the sliding speed of the belt;
 (b) preheating the mat to a temperature lower than the melting temperature of the thermoplastic polymer used for producing the sheets in the successive operation (c), or of the polymer having the lowest melting temperature among those used in the subsequent operation (c);
 (c) feeding onto the preheated mat, by fall from above, a thermoplastic polymer in powder;
 (d) compressing the mat with reduction of the initial thickness;
 (e) feeding onto the mat, by fall, a thermoplastic polymer in powder, either of the same type as the one of operation (c) or of different type;
 (f) heating the mat to a temperature equal to or higher than the softening temperature of the polymer present, or of the polymer having the highest softening temperature among those present in the mat;
 (g) feeding onto the mat, by fall, a thermoplastic polymer in powder, either of the same type as, or of different type from the one of operations (c) and (e);
 (h) compressing the aggregate consisting of mat the thermoplastic polymer to a temperature higher by at least 50° C. than the melting temperature of the thermoplastic polymer present, or to the melting temperature of the polymer having the highest melting temperature among the polymers present;
 (i) stiffening such aggregate by cooling under pressure.

The strands used to prepare the mat according to operation (a) consist of a plurality of glass monofilaments and have preferably a count ranging from 10 to 26 tex. The diameter of each monofilament constituting the strand is preferably, but not necessarily, comprised between 20 and 8 microns, more preferred values being those around 11.5 microns.

Deposition of the glass strands onto the surface of the conveyor belt is preferably accomplished by causing the strands to fall from one or more conveying rollers arranged above such surface and having a linear speed higher than the belt sliding speed. Such strands having, as mentioned hereinabove, a count ranging from 10 to 220 tex, but preferably from 10 to 26 tex, may come from reels arranged upstream of the aforesaid conveying rollers, on which reels the strands are wound as strands having a count of 100–300 tex or of 210–9600 tex, respectively. Preferably, the fall of the strands is directed towards the belt surface by a slight suction from below caused by the sucking devices arranged under such surface. By suitably adjusting the feed speed values of the glass strands in relation to the conveyor belt sliding speed it is possible to obtain mats of various thickness and porosity, depending on the process requirements and on the products to be obtained.

Of the total amount of thermoplastic polymer employed to prepare the sheet, and which generally represents 5–70% by weight of the sheet weight, from 5 to 60% by weight is preferably utilized in feeding step (c), while from 15 to 80% and from 5 to 60% by weight thereof is used in steps (e) and (g), respectively.

Preheating step (b) is preferably accomplished at temperature values not higher than the ones which are necessary to cause the softening of the thermoplastic polymer that will be used in successive step (c), or of the polymer having the lowest softening temperature among the polymers used in such step.

The particle size of the thermoplastic polymer powder to be used in the various feedings onto the mat will be chosen in order to permit a penetration into the mat thickness. Since the mat porosity is generally very high and the spaces between the fibers are very wide, it will be generally unnecessary to employ particular particle sizes for satisfactorily carrying out the process.

Compression step (d) has the purpose of reducing the thickness and porosity of the mat, in order to promote a homogeneous distribution of the powdered polymer within the mat during the successive feeding steps. Preferably the compression is such as to reduce the mat thickness, when leaving the compression area, to values ranging from 3/7 to 1/5 of the thickness exhibited by the mat when entering such area. Steps (b) to (h) are the essential steps of the process; they do not exclude, however, similar additional steps to be accomplished between step (b) and step (h). Consequently, mat compression operations, similar to operation, or step, (d), and successive feeding operation of the powdered polymer may be additionally accomplished after feeding operation (e), prior to heating (f), and/or after such heating (f) and prior to feeding (g).

Or also, one or more compression and successive feeding operations of the polymer can be carried out after feeding operation (g) and prior to compression operation (h). Likewise, additional heating operations, both to the thermoplastic polymer softening temperature, or to lower temperatures, can be accomplished prior to any additional feeding operation, if any, of the powdered polymer; also additional heating operations, to at least the softening temperature of the polymer, can be accomplished prior to the last-but-one feeding operations of said polymer. In this manner it is possible to attain an extremely homogeneous distribution of the powdered polymer within the whole thickness of the mat.

As polymers, it is possible to utilize all the thermoplastic polymers in general, such as the olefinic polymers, in particular low-density and high-density polyethylene, polypropylene, polybutene-1, poly-4-methyl-1-pentene, polyamides, vinyl polymers in general, poly(meth)acrylates, polyacrylonitrile, polyester resins.

The device forming one of the objects of the present invention is characterized in that it includes, in the order:

(A) one or more feeders of the glass strands,
(B) a conveyor belt underlying such feeders,
(C) a heating element for the glass strands,
(D) a proportioning device for the feeding of the thermoplastic polymer in powder, arranged above such conveyor belt,
(E) a compression roller for the compression of the aggregate of strands and polymer on the conveyor belt,
(F) a proportioning device for the powdered thermoplastic polymer feeding, arranged above the conveyor belt,
(G) a heating element for heating the glass strands,
(H) a proportioning device for the powdered thermoplastic polymer feeding, arranged above the conveyor belt,
(I) a compression element for compressing the aggregate of glass strands and of powdered polymer, at a temperature higher by at least 50° C. than the thermoplastic polymer melting temperature.

As feeders (A) there are preferably used rollers from which the glass strand is drawn, these rollers a rotation speed capable of allowing a glass strand feeding at a linear speed higher than the conveyor belt motion speed. Such rollers can be arranged at different heights from the conveyor belt surface, the minimum of such heights being suited to determine a fall height of the strands, from the point where they detach from the roller to the belt surface, equal to at least the value of the diameter of the roller, the minimum value of such height corresponding at least to 10 cm.

Conveyor belt (B) can be manufactured from a metallic material, or from a different material. Preferably it consists of a complex of two continuous belts, one of plastic material extending up to the area where heating element (C) is arranged, and the other, which moves at the same speed as the first one, of a metallic material or in any case of a heat resistant material.

Heating element (C) is preferably arranged under the belt surface containing the glass strand mat. Advantageously, but not necessarily, it can consist of an I.R.-ray source, or of electromagnetic induction devices.

Devices (D), (F) and (H), either like or unlike one another, may be of the conventional type, as is commonly used for the proportioned feeding of powdered or finely particulated material.

Heating element (G), either like or unlike element (C), is preferably placed above the surface of the conveyor belt containing the mat.

Finally, compressor (I) can consist of a continuous press, for example a "Continuous Press" manufactured by Sandwick, generally used also for manufacturing sheets in general.

Preferably, but not necessarily, a compression roller for the compression of the mat can be arranged above the belt surface, upstream of heating element (C).

FIG. I shows a vertical section through the device of the invention in a preferred embodiment.

In such FIGURE there are shown rollers (5) and (8) drawing and feeding glass strand (2) on continuous conveyor belt (13) which moves in the direction of the arrow, counter-rollers (6) and (9), mat (3), an optional roller (15) for the compression of the mat, continuous conveyor belt (29), made of heat-resistant material, with drawing rollers (17) and (18), heating element (19), roll proportioning devices (20), (22) and (24) of the powdered polymer, heating element (23), an air suction device (14), a pressure roller for the compression of the strands and polymer complex, (21), continuous press (30), reels (1).

Ancillary elements of the device of FIG. I are represented furthermore by antistatic bars (11), by an optional variable-tension tensioning device (7), which keeps constant the glass fiber tension, by creels (26), by stretchers (25) and by brushes, or scraping knives (10) for cleaning the rollers surfaces, and by motor (16) of the belt.

The following examples are given to illustrate the process according to the present invention, without being however a limitation thereof. In such examples, the glass fibers employed were previously treated with a conventional size based on polyvinylacetate and on silane compounds, according to known techniques.

EXAMPLE 1

By using a device having three feeding devices of the polypropylene powder, similar to the one shown in FIG. I, to which reference is made, there were prepared polypropylene sheets reinforced with 40% of glass fiber, having a thickness of 1.5 mm and a width of 0.65 m, operating under the following conditions.

Through 40 reels (1), an equal number of glass fiber strands (2), having a count of 105 tex, was fed to the system formed by rollers (5) and (8), counter-rollers (6) and (9), and tensioning device (7), under a tension of about 1.5 Kg. Roller (8) had a diameter of 80 cm and its center had a distance of 100 cm from the belt surface. By releasing the tension prior to the fall from roller (8), each strand divided into filaments (2') having a count of 26 tex, each consisting of elementary fibers of 11.5 μ diameter, which deposited onto conveyor belt (13) moving in the filament feeding direction, thus forming a mat of 16 cm thickness. The feeding speed of the filaments on belt (13) was 330 m/min., the belt sliding speed being 3 m/min. Belt (13) was made of PVC. The mat so formed was compressed by roller (15) to a thickness of about 8 cm, and successively was conveyed to steel belt (29), which moved in the same direction and at the same speed as belt (13). The mat was preheated to a temperature varying, within its thickness, from 130° to 135° C., by I.R.-ray source (19); then it was additioned, by the first proportioning device (20), with an amount of powdered polypropylene (having a melt index=12 and a melting temperature of 180° C., with particle sizes ranging from 70 to 900 meshes/cm$^2$) equal to 25% of the total polypropylene; successively the mat passed under pressure roller (21), so that its thickness reduced to about 5 cm and then, in the order, it passed under the second proportioning device (22) where it received 40% of the total polypropylene in powder, thereafter under the I.R.-ray source (23), where it was brought to a temperature at which the polymer began to melt (>170° C.), then under the third proportioning device (24) where it received the remaining 35% of the total polypropylene, and finally to the continuous press operating at a pressure of 2 bar, where it remained during 0.87 minutes in the melting area at a temperature of 210° C., and was successively cooled down to a temperature of 35°-40° C. in the cooling area of the press, cooled with water at 12° C.

A flat polypropylene sheet was thus obtained, free from transversal shrinkage and endowed with a homogeneous distribution of the continuous glass fibers.

Glass fibers and polypropylene feedings were 1.39 kg/min and 2.09 kg/min, respectively, during the entire process. The sheet density was of 1,190 kg/m$^3$, corresponding to 98% of the theoretical one (1,220 kg/m$^3$).

EXAMPLE 2

It was operated as in example 1, except that the glass fibers feeding speed was of 202 m/min, the belt sliding speed was of 0.70 m/min, the utilized number of reels was 30, the heating temperatures of the mat at the I.R.-ray sources (19) and (23) were 130°–135° C. and about 220° C. respectively. Furthermore, the polypropylene feedings by the first, second and third proportioning devices were, respectively, of 20%, 50% and 30%, the glass fiber feeding and the polypropylene feeding were, respectively, of 0.64 kg/min and 0.95 kg/min. Finally, the operative conditions in the continuous press were the following: a pressure of 5 bar, a temperature and a dwell time of the mat in the press melting area of 240° C. and 3.7 minutes, respectively, and a temperature of the stiff sheet in the cold area of the press equal to 35° C. The resulting sheet had a thickness of 3 mm, a width of 0.65 m and contained 40% by weight of homogeneously distributed glass fibers. The sheet density was of 1,180 kg/m$^3$ (theoretical value=1,220 kg/m$^3$).

EXAMPLE 3

It was operated as in example 1, with the following exceptions:
number of reels (instead of bobbins)=8
strands count=300 tex
count of the filaments falling onto the belt=10 tex
belt speed=0.7 m/min.
feed speed of the glass filaments=212 m/min.
Thermoplastic polymer in powder=nylon 6 (molecular weight=18,000) having a melting temperature of about 210° C.
Granulometry of the polymer powder ranging from 34 to 900 meshes/cm$^2$
Temperature of the mat at I.R-ray source (19) (upstream of the first proportioning device) ranging from 140° C. to 160° C.
Temperature of the mat at I.R.-ray source (23) (upstream of the third proportioning device) about 225° C. feeding of nylon 6 in powder=0.74 kg/min
Distribution of the polymer at the first, second and third proportioning devices=25%, 40% and 35%, respectively
Temperature of the mat in the press melting area=265° C. Mat dwell time in the melting area=3.7 minutes
Operating pressure of the continuous press=6 bar
Temperature of the sheet when leaving the cooling area of the continuous press=35° C.
The sheet obtained had a thickness=2 mm, a width=0.65 m and contained 40% of homogeneously distributed glass fibers. The sheet density was equal to 1,452 kg/m$^3$ (theoretical density=1,465 kg/m$^3$).

What we claim is:
1. A process for preparing thermoplastic polymer sheets reinforced with incorporated glass fibers, comprising, in the order, the following steps:
(a) preparing a mat of continuous glass strands, accomplished by deposition from above, onto the surface of a conveyor belt in motion, of glass strands having a count ranging from 10 to 220 tex, the linear feeding speed of the strands being higher than the belt sliding speed;
(b) preheating the mat to a temperature lower than the melting temperature of the thermoplastic polymer utilized for producing the sheets in successive step (c), or of the polymer having the lowest melting temperature among the polymers used in successive step (c);
(c) feeding onto the preheating mat, by fall from above, a thermoplastic polymer in powder;
(d) compressing the mat with reduction of the original thickness to a value ranging from 3/7 to 1/5;
(e) feeding onto the mat, by fall, a thermoplastic polymer in powder, either of the same or of different type in respect of the one of step (c);
(f) heating the mat to a temperature equal to or higher than the softening temperature of the polymer present therein, or of the polymer having the highest softening temperature among those present in the mat;

(g) feeding onto the mat, by fall, a thermoplastic polymer in powder, of a type either similar or different in respect of the one of steps (c) and (e);

(h) compressing the complex of mat and thermoplastic polymer at a temperature higher by at least 50° C. than the melting temperature of the thermoplastic polymer, or at the melting temperature of the polymer having the highest melting temperature among the polymers present therein;

(i) stiffening such complex by cooling under pressure.

2. The process according to claim 1, wherein the deposition of the strands onto the conveyor belt surface, according to step (a), is accomplished from a height equal to at least the value of the diameter of the fiber conveying roller, the minimum value of such height being equal to 10 cm.

3. The process according to claim 1 wherein the mat preheating temperature according to step (b) does not exceed the softening temperature of the thermoplastic polymer utilized in successive feeding step (c).

* * * * *